Feb. 14, 1933.     L. H. WHEELER     1,897,876
DEPTH GAUGE AND PUMP
Filed Sept. 17, 1930     2 Sheets-Sheet 1
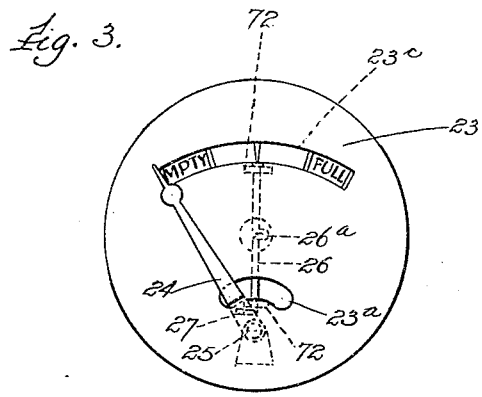
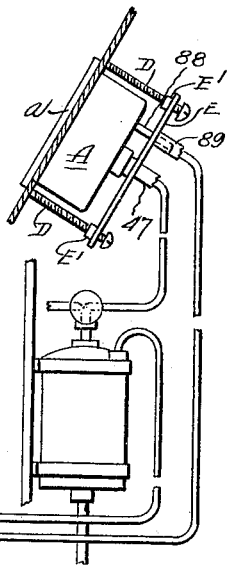
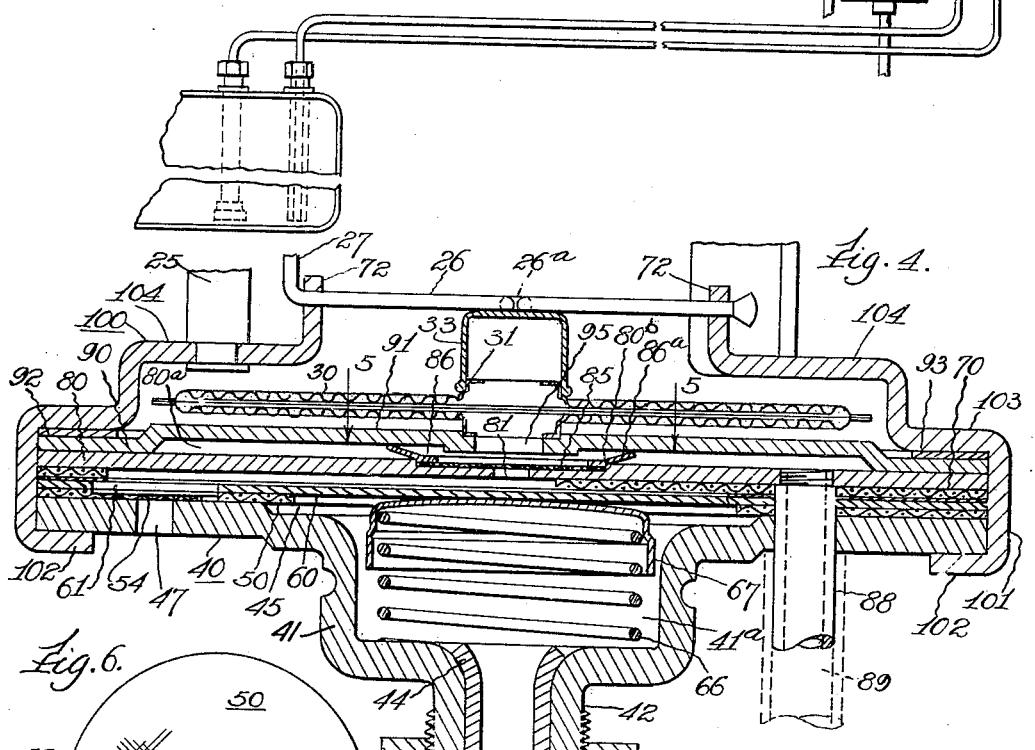
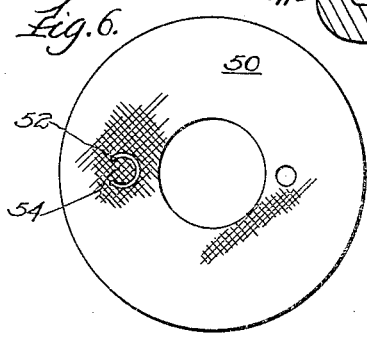
Inventor:
Leonard H. Wheeler.
by Burton & Burton
his Attorneys.

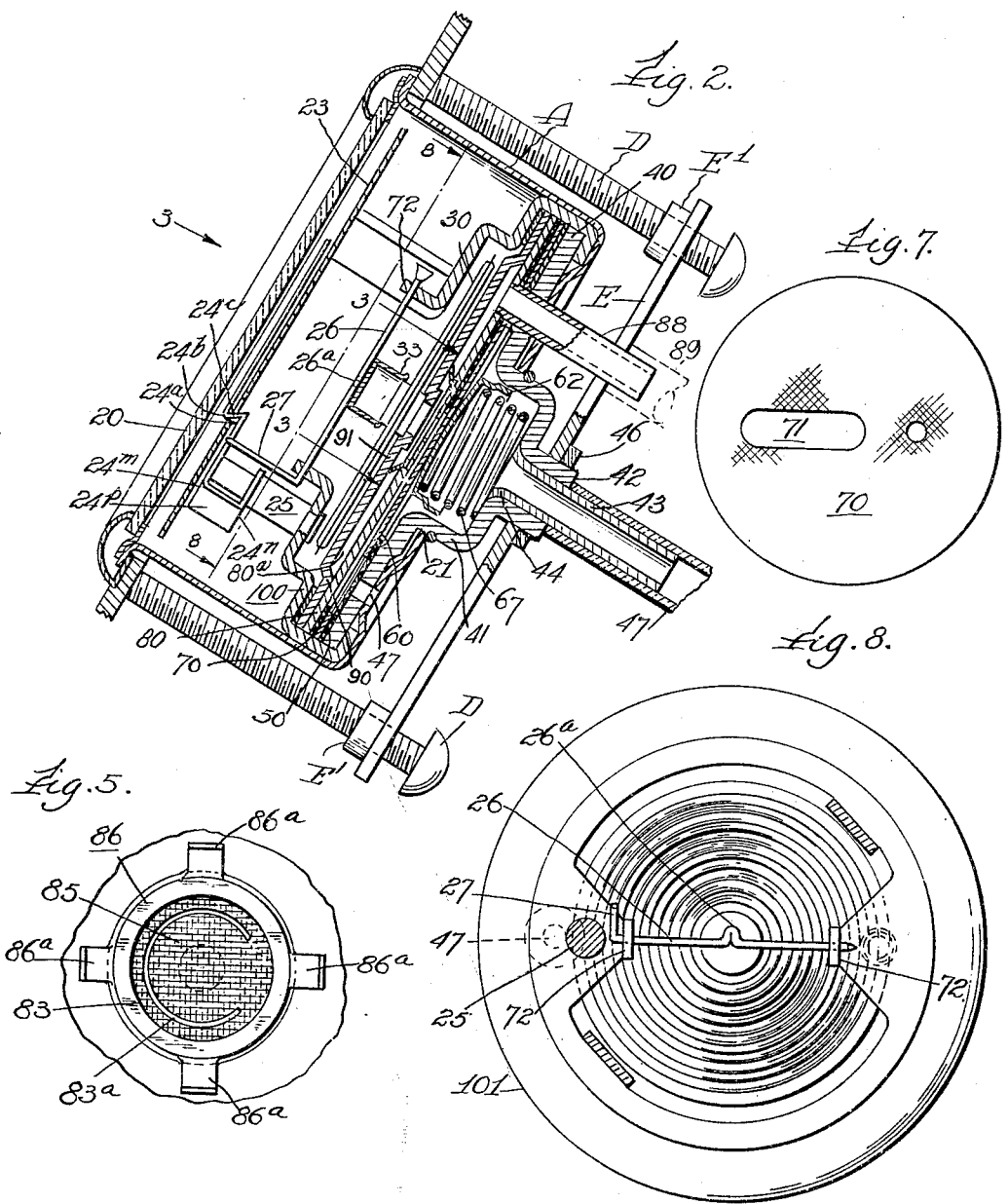

Patented Feb. 14, 1933

1,897,876

UNITED STATES PATENT OFFICE

LEONARD H. WHEELER, OF CHICAGO, ILLINOIS, ASSIGNOR TO STEWART-WARNER CORPORATION, OF CHICAGO, ILLINOIS, A CORPORATION OF VIRGINIA

DEPTH GAUGE AND PUMP

Application filed September 17, 1930. Serial No. 482,478.

The purpose of this invention is to provide an improved construction comprising a depth gauge and a pressure-responsive device by which the gauge is operated for indicating the depth of liquid in a tank with which the pressure-responsive device is connected, the same being particularly designed for indicating to the driver of a motor vehicle the depth of fuel remaining in the main supply tank at the rear of the vehicle.

A specific purpose of the invention is to provide a compact construction having both the gauge and pressure-actuated element assembled compactly as a substantially unitary construction in a unitary casing which may therefore be, all together, mounted in a convenient position on the vehicle. It consists of the elements and features of construction shown and described as indicated in the claims.

In the drawings:

Figure 1 is a diagrammatic view showing a construction embodying this invention in its position on the vehicle relative to the position of the fuel tank whose liquid content is to be indicated.

Figure 2 is an axial section of the device shown in Figure 1 mounted on the dash.

Figure 3 is an elevation looking in the direction of the arrow 3 on Figure 2 with the bezel ring and glass therein removed, on one half the scale of Figure 2.

Figure 4 is a portion of the section shown in Figure 2 upon an enlarged scale.

Figure 5 is a detail section at the staggered line 5—5 on Figure 4.

Figures 6 and 7 are plan views of fabric sheets or disks which serve for sealing chambers formed between metal disks or plates of the pressure developing unit and affording the valves for said unit, said views being on one half the scale of Figure 2.

Figure 8 is a section at the line 8—8 on Figure 2.

The structure illustrated comprises a casing which is adapted to be mounted, as hereinafter more particularly described, at the dash of the vehicle, and, as illustrated, on the instrument board which is commonly present. This casing comprises a sheet metal stamping, A, in cup form with an open front closed by a bezel glass, 20, and having the back centrally apertured, as seen at 21. Within this casing there are mounted three separate but cooperating elements which may be defined respectively as an indicator unit; a pressure developing unit; and a pressure-responsive unit. The indicator unit comprises a graduated dial plate, 23, and index hand, 24, pivoted centrally with respect to the graduation of the dial for vibration in relation to said graduations. The index hand, 24, is mounted for its vibratory movement over the dial upon a post, 25, which is mounted rigidly on the clasping member, 100, of the pressure developing element hereinafter described. The post, 25, terminates a short distance back of the dial plate, while the index hand is designed to vibrate over the dial in front of the dial plate. The index hand, therefore, has two acute angle bends, 24$^a$ and 24$^b$, in opposite directions, producing between them a short length, 24$^c$, transverse to the plane of the dial plate; and the latter has an arcuate slot, 23$^a$, properly located in the plate to accommodate the part, 24$^c$, of the index hand, so that the indicating end of the hand may be positioned in front of the dial plate for its vibration over the graduated scale, 23$^c$.

This index hand, hereinafter referred to as the moving member of the indicator, is counterweighted by its formation from a metal strip folded twice at right angles in the same direction as seen at 24$^m$, and 24$^n$, forming a loop 24$^p$, extending at the opposite side of the fulcrum on the post, 25, from the end constituting the index or pointer, the relative dimensions of the parts at opposite sides of the fulcrum being such as to cause the hand to be but slightly overbalanced on the side of the indicating terminal so that it falls to the zero position with respect to the graduated scale when free from any action of the pressure-responsive element hereinafter described, tending to move it or hold it in the other direction.

For actuating the index hand there is provided a lever arm, 27, extending integrally from a rock shaft, 26, formed of round rod having a U-shaped bend, 26ᵃ, intermediate two points of its length at which it is pivoted, as hereinafter described; said lever arm, 27, formed by bending the rod at right angles, projects past the portion of the indicator hand, 24, between its fulcrum on the post, 25, and the first acute angle bend, 24ᵃ, for extending up through the arcuate slot, 23ᵃ, and at the side of said hand toward the zero point of the graduated scale.

Pivot and fulcrum bearings for this lever arm, 27, are formed by lugs, 72, 72, struck up from the clasp member, 100, hereinafter more particularly described, of the pressure developing or pumping unit; and the actuation of said lever arm, 27, is effected by a central terminal of the pressure-responsive element hereinafter described, which in its entirety is mounted in the casing member, A, at a rear or inner part thereof, the forward or upper part being occupied by the gauge device or indicator comprising the parts already described.

The pressure-developing and pressure-producing element of the device comprises housing and chamber-forming members assembled and held in assemblage by the clasping member, 100, above mentioned, and comprising, in order from below upward, a relatively heavy rigid metal stamping, 40; an annular fabric spacing, sealing and valve-forming sheet or disk, 50; a thin stiff, but resiliently flexible disk, 60, preferably of some such material as phenolic compensation product; a second fabric spacing and sealing sheet or disk, 70; a rigid flat metal plate, 80, and a rigid metal plate, 90, which is a metal stamping formed with an upraise, 91, within a relatively narrow annular marginal area, 92, said upraise forming a thin chamber, 80ᵃ, between the plate, 80, and the plate, 90.

Referring to the assembled plates and sheets in detail:—The member, 40, is a circular disk having a centrally outstruck hollow boss, 41, with a further outstruck and central neck or stem, 42, exteriorly threaded for receiving a nut, 46, for a purpose hereinafter stated, and interiorly adapted for receiving a pipe nipple, 43.

The pipe nipple, 43, is inserted through and extended in said neck, 42, as seen at 44, for holding said nipple permanently joined to the member, 40.

The annular fabric spacing and valve forming disk, 50, has it outer diameter equal to that of the member, 40, and its inner diameter substantially equal to the diameter of a slight recess, 45, formed in the upper surface of the member, 40, marginally with respect to the cavity of the hollow boss, 41; and at one side it has a 270 degree arcuate cut indicated at 52 forming a valve, 54, for controlling an atmosphere port, 47, provided at corresponding position in the member, 40, and lapped by a port, 61, in the resilient disk, 60, said port, 61, being of diameter suitable for affording clearance around the valve, 54, which is arranged to vibrate in said port 61.

The resilient disk, 60, is equal in diameter to the member, 40, and the fabric disk, 50, and except for the pipe nipple 88 hereinafter mentioned, is apertured only to form the port and valve clearance, as described, at 61.

The fabric disk, 70, is equal in diameter to the parts, 40, 50 and 60, and has an aperture, 71, dimensioned for lapping the aperture, 61, of the disk, 60, and extending upward and past the center so as to lap also on a port, 81, at the center of the metal disk, 80, as hereinafter described.

The metal disks, 80 and 90, are equal in diameter to the parts, 40, 50, 60 and 70. The disk, 80, has a central aperture, 81, constituting a port which is controlled by a fabric valve, 85, hereinafter described. The disk, 90, is formed with an upraise, 91, forming at the under side a cavity, 80ᵃ, 80ᵃ constituting a chamber which is sealed at its circumference by airtight lap of the annular marginal area of the plate, 90, on the plate, 80.

The plate, 80, is recessed in its upper surface as seen at 80ᵇ, around the central port, 81, for accommodating a fabric-valve-providing disk, 83, having a 270 degree arcuate cut indicated at 83ᵃ, for forming the valve, 85, above referred to for controlling the port, 81. 86 is a light metal spider for holding the fabric disk, 83, in position in the recess, 80ᵇ, said spider having lugs, 86ᵃ, projecting across the space between the disks, 80 and 90, into contact with the under surface of the plate, 90, for holding the spider in position in the recess, 80ᵇ, and clamping the margin of the fabric disk, 83.

A gasket, 93, is provided above the annular marginal area of the part, 90, around the upraise, 91; and the parts, 40, 50, 60, 70, 80 and 90, and the gasket, 93, are clamped securely together by the clasp member, 100, which is formed as a metal stamping with a cylindrical portion, 101, of its cavity dimensioned for snugly accommodating said parts which are clasped and clamped together by it, said clasping and clamping being effected by clinching the end of said cylindrical portion inwardly below the assemblage, as seen at 102.

The upper part of said stamping comprises an inturned flange, 103, and radially extending lugs, 104, with upturned terminal lugs, 72, for carrying the rocker, 26, as above described.

On the upper side of the stamping, 90, at a port, 95, located at the center of said part, 90, there is mounted a resilient chamber, 30, which constitutes the pressure-responsive element above referred to, having its cavity in communication with said port, 95, by way of a central inlet nipple, 31, formed by flanging outwardly the margin of an aperture at the center of the lower member of the chamber, the upper member similarly apertured and flanged having the like aperture closed by a cap button, 33, soldered to the flange, 31, and serving as an operating terminal of the capsule for actuating the rock shaft, 26, and its lever arm, 27, by up thrust of said cap button, 33, against the bend constituting the short lever arm of the rock shaft, as above described.

In the cavity, 41ª, of the hollow boss, 41, of the member, 40, there is lodged a coil spring, 66, furnished with a hood, 67, for its upper end to bear against the under side of the resilient disk, 60, said spring being normally compressed in the assembling of the parts as described, so that it reacts against the disk, 60, for holding the latter stressed upwardly to its normally flat form and position as seen in Figure 2.

The parts, 40, 50, 60, 70 and 80 are apertured in alignment to admit through them a pipe nipple, 88, which is screwed through the plate, 80, for leading into the chamber, 80ª, formed between the plates, 80 and 90, as described.

The entire unit comprising the parts, 40, 50, 60, 70, 80 and 90, with the clasp member, 100, and the spring, 66, with its hood, 67, is dimensioned as above stated, for snug fit in the casing, A, with the boss, 41, protruding through the central aperture in the bottom or back of said casing; and for securing the entire unit thus in the casing, and securing the whole structure to the instrument board, there is provided a clamping bar, E, apertured at the middle point of its length to admit the reduced terminal or neck, 42, of the member, 40, said bar having at its opposite ends apertured and threaded bosses, E¹, E¹, for clamping bolts, D, D, which extend at opposite sides of the casing stopped at their upper ends against the instrument board; and the nut, 46, being screwed up against the clamping bar operates to stress the entire structure which is bound together by the clasp member into the bottom of the casing, A, and to stress the flange, a, of said casing against the instrument board, thus fixing the entire device securely in position on the instrument board.

The operation of this construction may be understood from the foregoing description as being that when the structure is mounted as described on the instrument board, the pipe nipple, 43, is connected by hose or flexible pipe, 47, with a source of alternating higher and lower pressures, as the intake manifold of the engine or the vacuum chamber of a vacuum tank when the vehicle is so provided for feeding the carbureter as illustrated in Figure 1. The nipple, 88, is then connected by suitable flexible pipe, 89, which leads to the fuel supply tank in which it is intruded into the liquid content to the depth above which that content is to be measured and indicated by the indicator.

When thus mounted and connected it will be understood that the alternation of higher and lower fluid pressures derived from the intake manifold or from the vacuum tank will produce a pumping action due to the alternate enlargement and reduction of what may be called the pumping chamber, being the space between the resilient diaphragm, 60 and the rigid plate, 80, the air being drawn in past the valve, 54, in the enlargement of said chamber due to the retraction of the diaphragm resulting from suction operating through the pipe, 47, and said air being expelled past the valve, 85, upon interruption of the suction permitting the spring, 66, to restore the diaphragm to its normally flat form and position.

And it will be seen that the air forced past the valve, 85, operates for pressure both through the pipe, 89, and in the resiliently extended capsule, 30, constituting the pressure-responsive element, and with the same pressure in the capsule as through the pipe, 89. And the capsule acting by the central cap, 31, on the indicator, will cause the latter if properly adjusted, to indicate the pressure which is operative through the pipe, 89.

I claim:

1. An apparatus for the purpose indicated comprising a pressure-developing unit consisting of a pump structure comprising a succession of disk members and thin spacers interposed between the circumferential margins of consecutive disks and thereby forming thin sealed chambers between said consecutive disks, the latter having inlet and discharge ports to and from their respective chambers, and valve means controlling said ports carried by said spacers respectively, one of said disks having an interruption in its area and a pumping member operatively associated therewith at said interruption.

2. An apparatus for the purpose indicated having a pumping structure comprising three disks arranged in axial succession to form between each two consecutive disks a pump chamber; sealing means interposed between the circumferential marginal areas of the consecutive disks for spacing them apart to add capacity to the chambers, the middle one of said disks being flexible and thereby adapted for operating as the pumping member, the disks having inlet and discharge ports and valves controlling them, the sealing means between the outer disk and said flexible pumping disk being a fabric disk, the valve controlling the inlet port being carried by said fabric disk.

3. An apparatus for the purpose indicated having a pumping structure comprising three disks arranged in axial succession to form between each two consecutive disks a pump chamber; sealing means interposed between the circumferential marginal areas of the consecutive disks for spacing them apart to add capacity to the chambers, the middle one of said disks being flexible and thereby adapted for operating as the pumping member, the disks having inlet and discharge ports and valves controlling them, the sealing means between the outer disk and said flexible pumping disk being a fabric disk, the valve controlling the inlet port being integral with said fabric disk.

4. An apparatus for the purpose indicated comprising a pressure developing unit and a pressure-responsive unit, the pressure-developing unit comprising two rigid disks and a sealing spacer and valve-carrying member interposed between them forming a thin flat chamber; the first of said rigid disks having an interruption in its area and a flexible pumping member mounted fluid-tight on said first mentioned disk extending over said area-interruption, said first disk having an inlet port, and a check valve carried by the sealing spacer, controlling said inlet port and seating against outflow, the second of said rigid disks having an outlet port; a third rigid disk mounted fluid-tight on the second disk at the opposite side thereof from the first disk and having a recess in its face toward the second disk constituting a chamber, the second disk having an inlet port adapted to establish communication between the first mentioned chamber and the last mentioned chamber, said last mentioned chamber having a discharge port communicating with the pressure-responsive unit and having also connection communicating with said outlet port for pressure discharge leading to a point in a receptacle the depth of whose liquid content above said point is to be measured, and valve means interposed in said second chamber controlling said inlet port arranged for seating against backflow from the second mentioned chamber to the first mentioned chamber.

In testimony whereof, I have hereunto set my hand at Chicago, Illinois, this 13 day of Sept., 1930.

LEONARD H. WHEELER.